(12) United States Patent
Qasymeh et al.

(10) Patent No.: US 11,513,377 B2
(45) Date of Patent: Nov. 29, 2022

(54) WIDEBAND GRAPHENE-BASED ELECTRO-OPTIC ENTANGLER

(71) Applicant: Abu Dhabi University, Abu Dhabi (AE)

(72) Inventors: Montasir Yousof Abdallah Qasymeh, Abu Dhabi (AE); Hichem El Euch, Abu Dhabi (AE)

(73) Assignee: ABU DHABI UNIVERSITY, Abu Dhabi (AE)

(*) Notice: Subject to any disclaimer, the term of this patent is extended or adjusted under 35 U.S.C. 154(b) by 0 days.

(21) Appl. No.: 17/340,008

(22) Filed: Jun. 5, 2021

(65) Prior Publication Data

US 2021/0294131 A1    Sep. 23, 2021

Related U.S. Application Data

(62) Division of application No. 16/676,539, filed on Nov. 7, 2019, now Pat. No. 11,048,107.

(51) Int. Cl.
| | |
|---|---|
| *G02F 1/035* | (2006.01) |
| *G02B 6/122* | (2006.01) |
| *G02F 3/00* | (2006.01) |
| *G06N 10/00* | (2022.01) |
| *B82Y 10/00* | (2011.01) |
| *G02B 6/12* | (2006.01) |

(52) U.S. Cl.
CPC ......... *G02F 1/0356* (2013.01); *G02B 6/1226* (2013.01); *G02F 3/00* (2013.01); *G06N 10/00* (2019.01); *B82Y 10/00* (2013.01); *G02B 2006/12069* (2013.01); *G02F 2203/10* (2013.01)

(58) Field of Classification Search
CPC ...... G02F 1/0356; G02F 3/00; G02F 2203/10; G02B 6/1226; G02B 2006/12069; G06N 10/00; B82Y 10/00
See application file for complete search history.

(56) References Cited

U.S. PATENT DOCUMENTS

| | | | |
|---|---|---|---|
| 10,348,058 B1* | 7/2019 | Gwo | H01S 5/187 |
| 10,877,194 B2* | 12/2020 | Beechem, III | G02B 5/204 |
| 2013/0071083 A1* | 3/2013 | Kim | G02B 6/12 |
| | | | 385/131 |
| 2015/0372159 A1* | 12/2015 | Englund | G01J 3/12 |
| | | | 250/206 |
| 2016/0225449 A1* | 8/2016 | Loertscher | G11C 13/047 |
| 2018/0246350 A1* | 8/2018 | Ma | G02F 1/011 |

OTHER PUBLICATIONS

Chiem, Dinh, Non-Final Office Action, U.S. Appl. No. 17/340,006, filed Jun. 7, 2021. pp. 1-12. United States Patent and Trademark Office. USA.

Calafel, Alonso et al., Quantum Computing with Graphene Plasmons, NPJ Quantum Inf, pp. 1-7, No. 5, 37, Nature and The University of New South Wales, USA and UK.

* cited by examiner

*Primary Examiner* — Ryan A Lepisto
*Assistant Examiner* — Erin D Chiem

(57) ABSTRACT

A electronic method, includes receiving, by a graphene structure, a SPP mode of a particular frequency. The electronic method includes receiving, by the graphene structure, a driving microwave voltage. The electronic method includes generating, by the graphene structure, an entanglement between optical and voltage fields.

13 Claims, 13 Drawing Sheets

WIDEBAND GRAPHENE-BASED ELECTRO-OPTIC ENTANGLER

BACKGROUND

Entanglement has been used in a variety of applications that include quantum teleportation, satellite quantum communication, submarine quantum communication, quantum internet, quantum error correction, and quantum cryptography. Various configurations exist that can initiate entanglement, including the use of a beam splitter, two trapped ions entanglement, and entanglement of two microwave radiations. In the entanglement of microwave and optical fields, several systems exist but have limitations. This includes a sensitivity of a mechanical resonator to thermal noise. In other approaches, a whispering gallery mode resonator filled with electro-optical material may be used. In this approach, an optical field is coupled to the whispering gallery resonator while a microwave field drives the resonator. However, there are limitations that include that the free spectral range of the whispering resonator must match the microwave frequency which can also limit tunability. Thus, there is no effective technique that achieve a wide band entanglement of microwave and optical fields with a large tunability

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may provide for microwave and optical entanglement using a capacitor loaded with graphene plasmonic waveguide. In embodiments, a quantum microwave signal of a particular frequency may drive a capacitor (e.g., an electrical capacitor) while an optical field (e.g., an optical pump) of a particular frequency is launched to the graphene waveguide in a surface plasmon polariton (i.e., SPP) mode. In embodiments, the two fields (microwave and optical) may interact based on electrically modulating a graphene optical conductivity. As such, upper and lower SPP sideband modes (e.g., $\omega_2 = \omega_1 + \omega_m$ and $\omega_3 = \omega_1 - \omega_m$) are generated. In embodiments, the microwave signal and the lower SPP sideband are entangled based on a particular pump intensity.

As such, a quantum mechanics model may be generated to determine fields evolution. In embodiments, the entanglement of the microwave and optical fields may be evaluated based on waveguide length, pump intensity, and microwave frequency. In embodiments, the two fields (microwave and optical) may be entangled over a vast microwave frequency range. Additionally, a quantity of entangled photons are also generated at the lower SPP sideband. Thus, the systems and methods described herein provides a tunable mechanism for microwave-optical entanglement within a more efficient quantum system.

Accordingly, microwave and optical fields entanglement may be provided based on electrical capacitor loaded with graphene plasmonic waveguide. In embodiments, the microwave signal may drives parallel plates of the capacitor, with the graphene waveguide supporting a surface plasmon polariton (i.e., SPP) mode. The microwave voltage and the SPP mode interact via electrically modifying the graphene optical conductivity. In embodiments, a driving microwave signal and a lower sideband are entangled for a particular pump intensity $|A_1|^2$. In embodiments, the entanglement may be analyzed and changed based on different parameters including the graphene waveguide length, the microwave frequency, the microwave number of photons and the pump intensity. Thus, entanglement occurs, and can be tunable, over a larger frequency range based on particular pump intensities.

Figure 1:
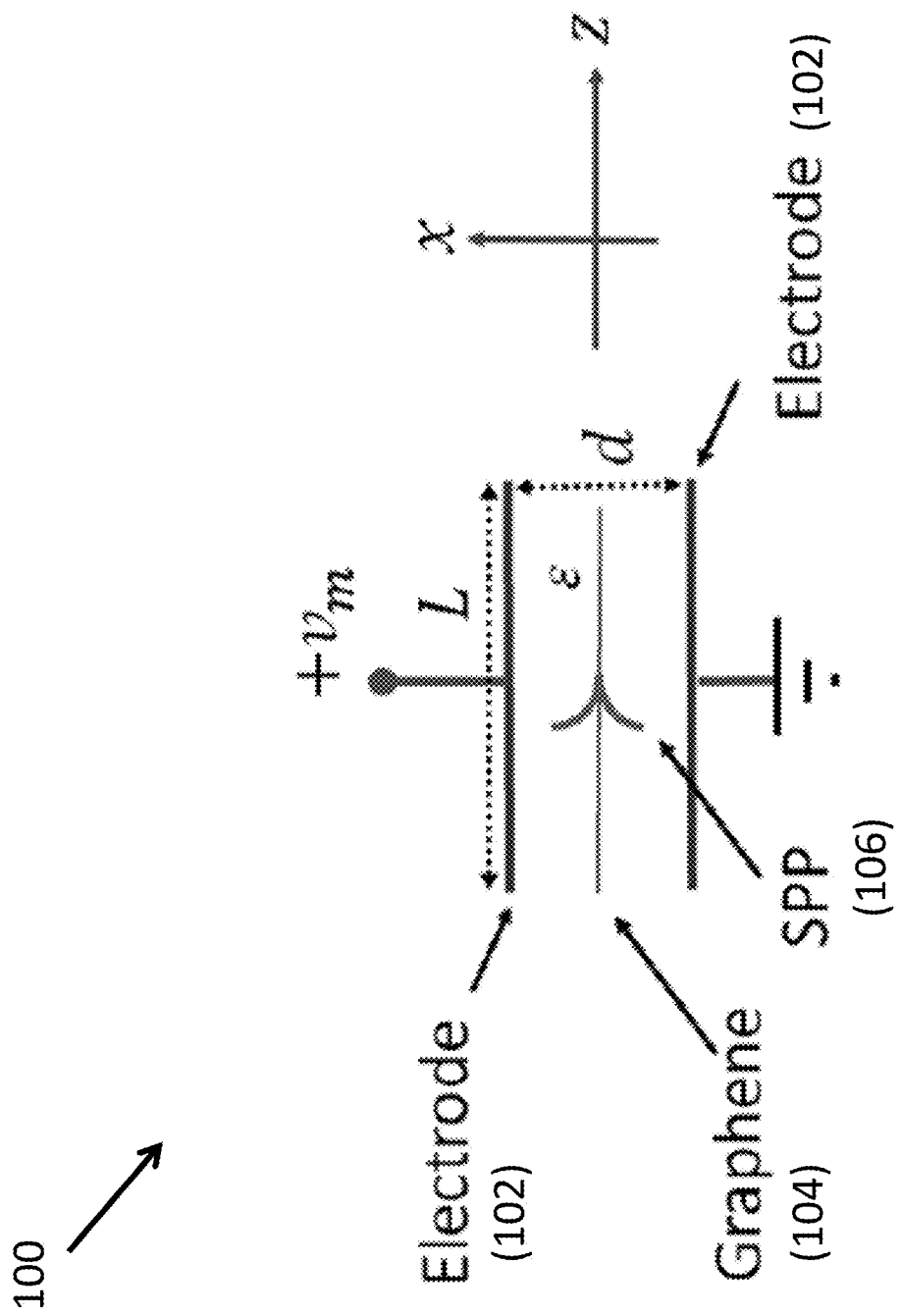
FIG. 1 is a diagram of an example model graphene structural design.

FIG. 1 shows an example superconducting parallel plate capacitor loaded with a graphene layer. In embodiments, two plates (each 102) are separated by a distance d and have a particular area (L×W). In embodiments, a graphene layer is located equidistant between the two plates. In alternate embodiments, the graphene layer may be closer to one plate than the other plate. In embodiments, the capacitance may be $C = \varepsilon \varepsilon_0 / d$. In embodiments, the capacitance may be driven by a microwave signal as described by equation (1):

$$V_m = V e^{-i\omega_m t} + c.c. \tag{1}$$

In embodiments, a transverse magnetic (i.e., TM) surface plasmon polariton (SPP) mode is coupled to the graphene waveguide. In embodiments, the SPP mode is described by its associated electrical (and magnetic) fields, given by equations (2) and (3):

$$\vec{E} = \mathcal{U}(z)(\mathcal{D}_x(x)\vec{e}_x + \mathcal{D}_z(x)\vec{e}_z)e^{-i(\omega t - \beta z)} + c.c. \tag{2}$$

$$\vec{H} = \mathcal{U}(z)\mathcal{D}_y(x)\vec{e}_y e^{-i(\omega t - \beta z)} + c.c. \tag{3}$$

In embodiments, U(z) is a complex amplitude, $D_x(x) = \{(\beta i/\omega\varepsilon\varepsilon 0)e^{\alpha x}$ for $x<0$; $(\beta i/\omega\varepsilon\varepsilon 0)e^{-\alpha x}$ for $x>0\}$, $D_z(x) = \{(\alpha i/\omega\varepsilon\varepsilon 0)e^{\alpha x}$ for $x<0$; $(\alpha i/\omega\varepsilon\varepsilon 0)e^{-\alpha x}$ for $x>0\}$, and $D_y(x) = \{e^{\alpha x}$ for $x<0$; $e^{-\alpha x}$ for $x>0\}$ are special distributions of the SPP mode, $\alpha = (\beta^2 - \varepsilon k^2)^{1/2}$ and $k_0 = \omega/c$ are the free space propagation constant, and c is the speed of the light in the vacuum. In embodiments, a dispersion relation of the SPP mode is given by equation (4):

$$\beta = k_0 (1 - (2/Z_0 \sigma_s)^2)^{1/2} \tag{4}$$

In embodiments, $Z_0 = 377\Omega$ is a free space impedance and $\sigma_s$ is the graphene conductivity. In embodiments, for an input SPP mode of frequency $\omega_1$ and a driving microwave voltage of frequency $\omega_m$, an upper and lower SPP sidebands are generated at frequencies $\omega_2 = \omega_1 + \omega_m$ and $\omega_3 = \omega_1 - \omega_m$ based on graphene conductivity modulation. In embodiments, associated electric fields with these particular SPP modes are given by $$\vec{E}_j = \mathcal{U}_j(z)(\mathcal{D}_{xj}(x)\vec{e}_x + \mathcal{D}_{zj}(x)\vec{e}_z)e^{-i(\omega_j t - \beta_j z)} + c.c.$$

In embodiments, j includes {1,2,3}. In embodiments, upon implementing a perturbation approach, the effective propagation constant of the SPP modes can be approximated by $\beta j=\beta'_j+V\beta''e^{-i\omega_m t}+c.c$, and thus, the corresponding effective permittivity of the SPP modes is given by equation (5):

$$\varepsilon_{eff_j} = \varepsilon'_{eff_j} + V\varepsilon''_{eff_j}e^{-i\omega_m t} + c.c \qquad (5)$$

where $$\varepsilon'_{eff_j} = \left(\frac{\beta'_j}{k_{0_j}}\right)^2 \cdot \varepsilon''_{eff_j} = 2\frac{\beta'_j \beta''_j}{k_{0_j}^2}, \beta'_j$$

is a solution of the dispersion related to equation (4), and $$\beta''_j = \frac{\beta'_j}{1-\left(\frac{1}{2}Z_0\sigma'_{s_j}\right)^2}\frac{\sigma''_{x_j}}{\sigma'_{x_j}}, \text{ and } \sigma''_{s_j}$$

is the perturbed graphene conductivity term. In embodiments, the SPP modes are contained between two plates with negligible overlapping with the electrodes. In embodiments, the negligible overlapping can be achieved by separating the distance between two electrodes d larger than $1/\alpha$. For example, if $d=10/\alpha$, then 99.99% of the SPP mode is contained within the gap between two parallel plates.

In embodiments, interacting fields can be quantized by the following relations in equation (6):

$$\mathcal{U}_j = \frac{(\hbar\omega_j)^{\frac{1}{2}}}{\xi_j^{\frac{1}{2}}(\varepsilon_0\varepsilon'_{eff_j}V_L)^{\frac{1}{2}}}\hat{a}_j, \text{ and } \mathcal{V}=\left(\frac{2\hbar\omega_m}{C\mathcal{A}_r}\right)^{\frac{1}{2}}\hat{b} \qquad (6)$$

Where
$\hat{a}_j$ and $\hat{b}$
are annihilation operators of the $j^{th}$ optical and microwave fields, respectively. In embodiments, the SPP volume is:

$$V_L = \mathcal{A} \int_{-\infty}^{+\infty}(|\mathcal{D}_{x_j}|^2+|\mathcal{D}_{z_j}|^2)\partial x$$

and a unit-less parameter is:

$$\xi_j = \frac{1}{2} + \frac{\mu_0}{2\varepsilon_0\varepsilon'_{eff_j}}\frac{\int_{-\infty}^{+\infty}|\mathcal{D}_{y_j}|^2\partial x}{\int_{-\infty}^{+\infty}(|\mathcal{D}_{x_j}|^2+|D_{z_j}|^2)\partial x}$$

which is introduced to match the expression of the free Hamiltonian of the SPP modes to the expression of the free Hamiltonian of the corresponding unguided fields. Accordingly, the spatial distribution of the SPP modes is completely included in the conversion rates $g_2$ and $g_3$. In embodiments, the quantum Hamiltonian is given by equation (7):

$$\mathcal{H} = \mathcal{H}_0 + \mathcal{H}_1 \qquad (7)$$

where equation (8) is:

$$\hat{\mathcal{H}}_0 = \hbar\omega_m\hat{b}^\dagger\hat{b} + \sum_{j=1}^{3}\hbar\omega_j\hat{a}_j^\dagger\hat{a}_j, \text{ and } \hat{\mathcal{H}}_1 = \hbar g_2\hat{a}_2^\dagger\hat{b}\hat{a}_1 + \hbar g_3\hat{a}_1^\dagger\hat{b}\hat{a}_3 + h.c. \qquad (8)$$

with h.c. is the Hermitian conjugate, and $g_2$ and $g_3$ are the conversion rates given by equations (9) and (10):

$$g_2 = \frac{1}{2}\varepsilon''_{eff_2}\text{sinc}\left(\frac{\beta_1-\beta_2}{2}L\right)e^{i\frac{\beta_1-\beta_2}{2}L}\left(\frac{2\omega_1\omega_2\hbar\omega_m}{C\mathcal{A}_r\varepsilon'_{eff_1}\varepsilon'_{eff_2}}\right)^{\frac{1}{2}}\frac{I_{12}}{\sqrt{\xi_1\xi_2}} \qquad (9)$$

$$g_3 = \frac{1}{2}\varepsilon''_{eff_3}\text{sinc}\left(\frac{\beta_3-\beta_1}{2}L\right)e^{i\frac{\beta_3-\beta_1}{2}L}\left(\frac{2\omega_3\omega_1\hbar\omega_m}{C\mathcal{A}_r\varepsilon'_{eff_1}\varepsilon'_{eff_3}}\right)^{\frac{1}{2}}\frac{I_{13}}{\sqrt{\xi_1\xi_3}} \qquad (10)$$

where $$I_{mn} = \frac{\int_{-\infty}^{+\infty}(\mathcal{D}^*_{x_m}\mathcal{D}_{x_n}+\mathcal{D}^*_{z_m}\mathcal{D}_{z_n})\partial x}{\sqrt{\int_{-\infty}^{+\infty}(|\mathcal{D}_{x_m}|^2+|\mathcal{D}_{z_m}|^2)\partial x}\sqrt{\int_{-\infty}^{+\infty}(|\mathcal{D}_{x_n}|^2+|\mathcal{D}_{z_n}|^2)\partial x}}$$

In embodiments, the SPP pump at frequency Wi is intensive and treated classically. Thus, substituting a quantum Hamiltonian expression of equation (7) into Heisenberg equations of motion, that is:

$$\frac{\partial\hat{x}}{\partial t} = \frac{i}{\hbar}[\hat{\mathcal{H}},\hat{x}]$$

and using the rotation approximation:

$$\hat{o}_j = \hat{O}_j e^{-i\omega_1 t}$$

the following equations of motions (equations (11), (12), and (13)) are generated:

$$\frac{\partial\hat{A}_2}{\partial t} = \frac{\Gamma_2}{2}\hat{A}_2 + g_2 A\hat{B} + \sqrt{\Gamma_2}\hat{N}_2, \qquad (11)$$

$$\frac{\partial\hat{A}_3}{\partial t} = \frac{\Gamma_3}{2}\hat{A}_3 + g_3 A\hat{B}^\dagger + \sqrt{\Gamma_3}\hat{N}_3 \qquad (12)$$

$$\frac{\partial\hat{B}}{\partial t} = \frac{\Gamma_m}{2}\hat{B} - g_2 A^*\hat{A}_2 + g_3 A\hat{A}_3^\dagger + \sqrt{\Gamma_m}\hat{N}_m \qquad (13)$$

In embodiments, the optical delay coefficient is given by:

$$\Gamma_j = 2v_g Im(\beta')$$

and the Γm represents microwave decay coefficient. In embodiments, the group velocity is:

$$v_g = \frac{\partial f}{\partial\beta}$$

In embodiments, the pump field amplitude $A_1$ is considered with $\Pi/2$ phase (i.e., $A_1=Ae^{i\Pi/2}=iA$), and $N_2$ and $N_m$ are quantum Langevin noise operators. In embodiments, the dissipation is characterized by the time decay rates, included in equations (11) and (13). Thus, based on a fluctuation-dissipation theorem, the Langevin forces are included. In embodiments, the quantum coupled equations of motion presented above describe an evolution of the SPP modes and the driving microwave signal.

In embodiments, no steady state is considered as the interaction is carried out while the propagating SPP modes are coupled to the optical pump. Thus, the time rates of the SPP averages are non-zero, where:

$$\left(\frac{\partial \langle \hat{A}_j \rangle}{\partial t} \neq 0\right)$$

To evaluate the entanglement while fulfilling the non-zero requirement, the entanglement between the following factors is evaluated using the Duan's criterion in (14):

$\hat{B}$ and $\hat{A}_3$

In embodiments, equation (14) is as follows:

$$\Lambda = \begin{vmatrix} 1 & \langle \hat{A}_3 \rangle & \langle \hat{B}^\dagger \rangle \\ \langle \hat{A}_3^\dagger \rangle & \langle \hat{A}_3^\dagger \hat{A}_3 \rangle & \langle \hat{A}_3^\dagger \hat{B}^\dagger \rangle \\ \langle \hat{B} \rangle & \langle \hat{A}_3 \hat{B} \rangle & \langle \hat{B}^\dagger \hat{B} \rangle \end{vmatrix} \quad (14)$$

and that entanglement exists whenever the determinant is negative ($\Lambda < 0$). In embodiments, average rate equations (equations (15), (16), and (17)) are obtained by using equations (11), (12), and (13):

$$\frac{\partial \langle \hat{A}_2 \rangle}{\partial t} = -\frac{\Gamma_2}{2} \langle \hat{A}_2 \rangle + g_2 A \langle \hat{B} \rangle \quad (15)$$

$$\frac{\partial \langle \hat{A}_3 \rangle}{\partial t} = -\frac{\Gamma_3}{2} \langle \hat{A}_3 \rangle + g_3 A \langle \hat{B}^\dagger \rangle \quad (16)$$

$$\frac{\partial \langle \hat{B} \rangle}{\partial t} = -\frac{\Gamma_m}{2} \langle \hat{B} \rangle - g_2 A^* \langle \hat{A}_2 \rangle + g_3 A \langle \hat{A}_3^\dagger \rangle \quad (17)$$

Figure 2:
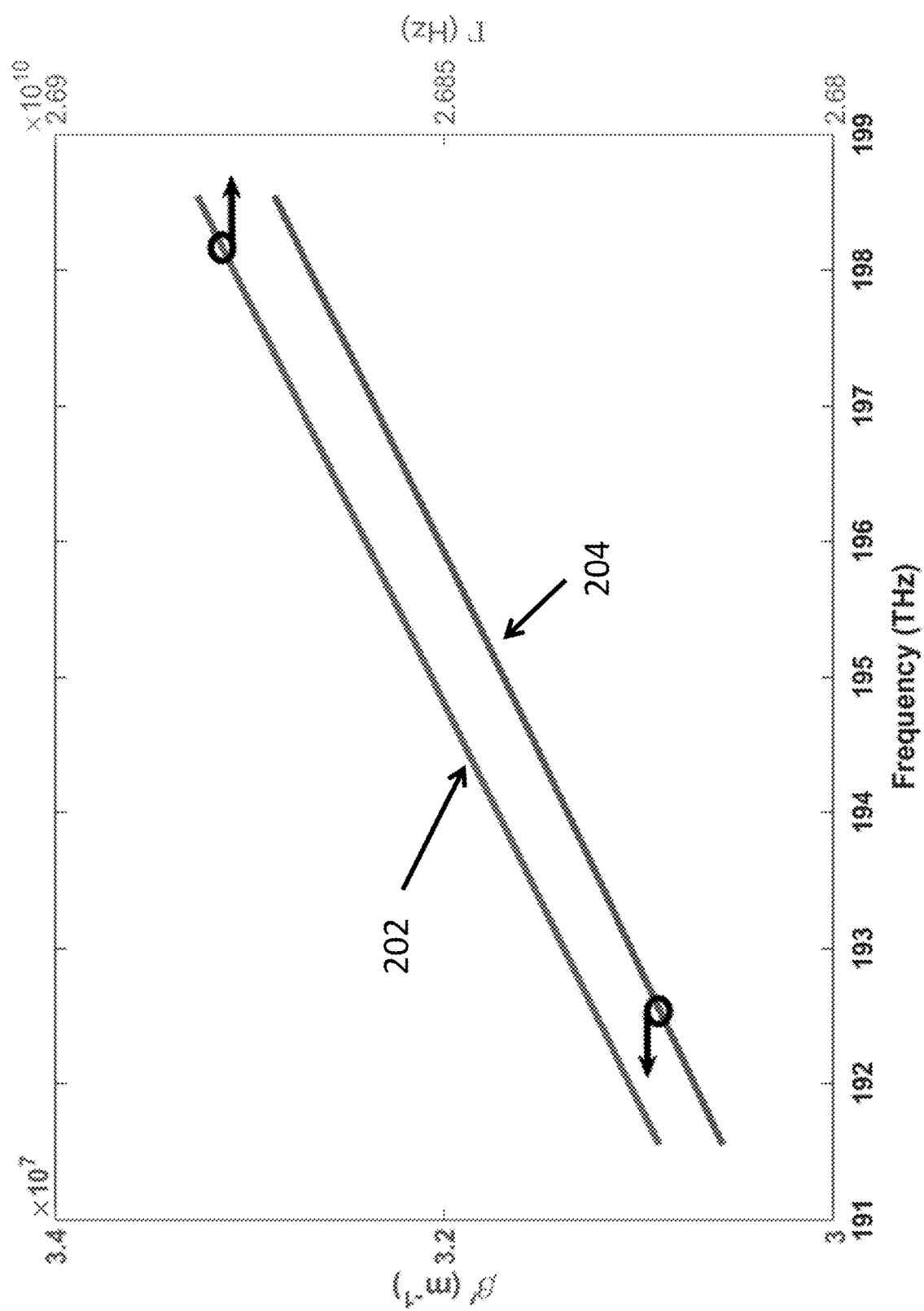
FIG. 2 is a diagram of an example model capacitance design.

Next, the regression method is used to model the rate equations of the following averages:

$\langle \hat{A}_3^\dagger \hat{A}_3 \rangle, \langle \hat{A}_3^\dagger \hat{B}^\dagger \rangle, \langle \hat{A}_3 \hat{B} \rangle$ and $\langle \hat{B}^\dagger \hat{B} \rangle$ In embodiments, equations (15), (16), and (17) are solved to obtain values to evaluate a condition in equation (14) at specific time interval $t = L/v_g$. In embodiments, microwave and optical operators are considered uncorrelated at $t=0$, and thus:

$\langle \hat{A}_j^\dagger \hat{B}^\dagger \rangle |_{t=0} = \sqrt{\langle \hat{B}^\dagger \hat{B} \rangle} |_{t=0} \sqrt{\langle \hat{A}_j^\dagger \hat{A}_j \rangle} |_{t=0}$ $\langle \hat{A}_j \hat{B} \rangle |_{t=0} = \sqrt{\langle \hat{B}^\dagger \hat{B} \rangle} |_{t=0} \sqrt{\langle \hat{A}_j^\dagger \hat{A}_j \rangle} |_{t=0}$ In embodiments, the number of microwave photons at $t=0$, are as follows:

$\langle \hat{A}_3^\dagger \hat{A}_3 \rangle |_{t=0} = 0$ $\langle \hat{A}_2^\dagger \hat{A}_2 \rangle |_{t=0} = 0$ Based on the preceding examples and equations, an electrical capacitor is considered with air filling material. In embodiments, a graphene doping concentration is $n_0 = 10^{18}$ m$^{-3}$, the pump frequency is $\omega_1/2\Pi = 193$ THz and the temperature is T=3 mK. In embodiments, the SPP propagation constant $\beta$ (and the decay time constant $\Gamma$ are shown in FIG. 2 as a relationship to optical frequency. As such, by calculating $\alpha$ from the values of $\beta$, it is shown that for a separating distance of $d=1$ μm (where C=8.85 μF/m$^2$), the SPP field amplitude is identical to zero at the electrodes location x, is $$x = \pm \frac{d}{2} \left( \text{i.e.} e^{-\alpha \frac{d}{2}} = e^{-34} \right)$$

Figure 3:
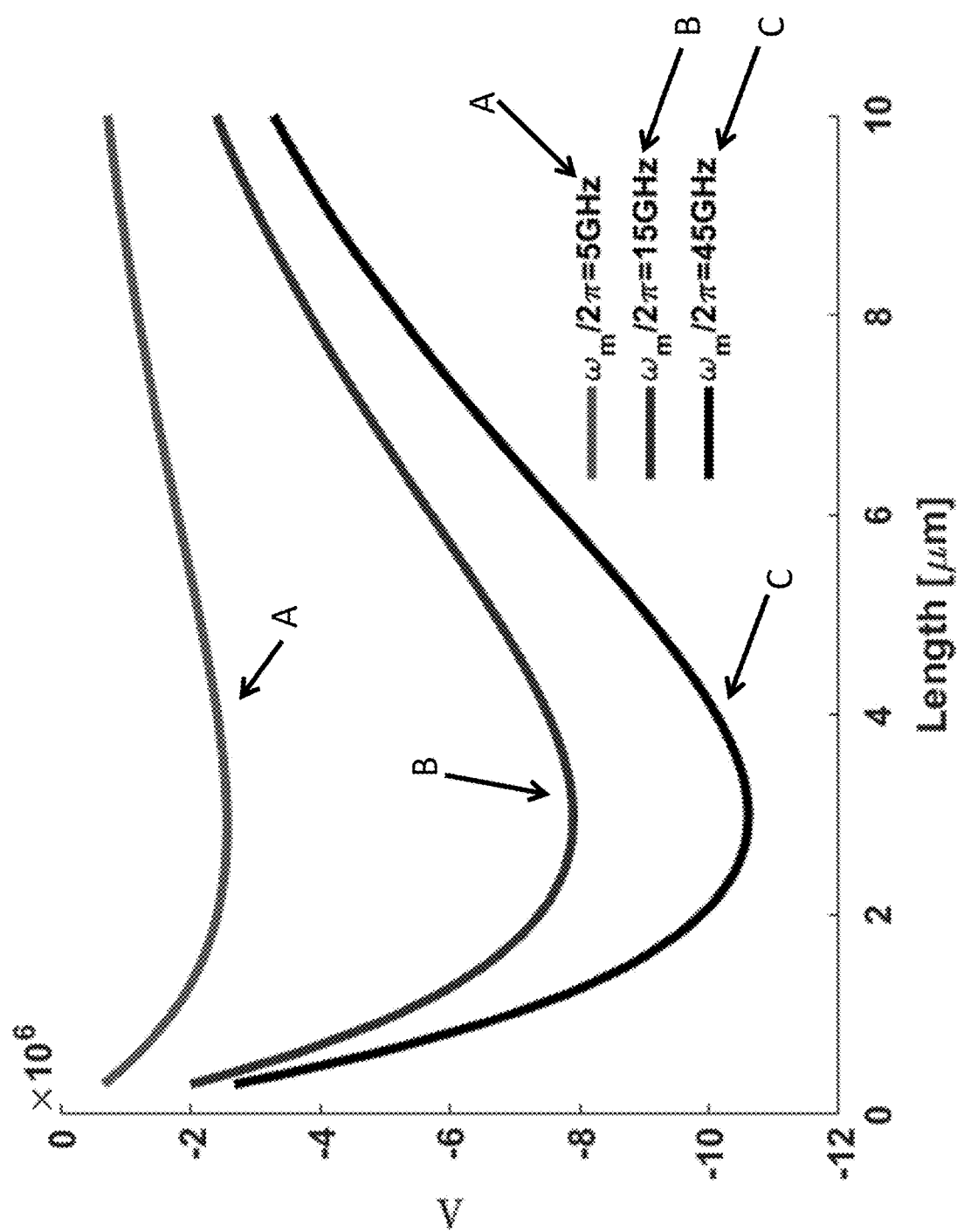
FIGS. 3 and 4 are example electronically generated graphs.
Figure 4:
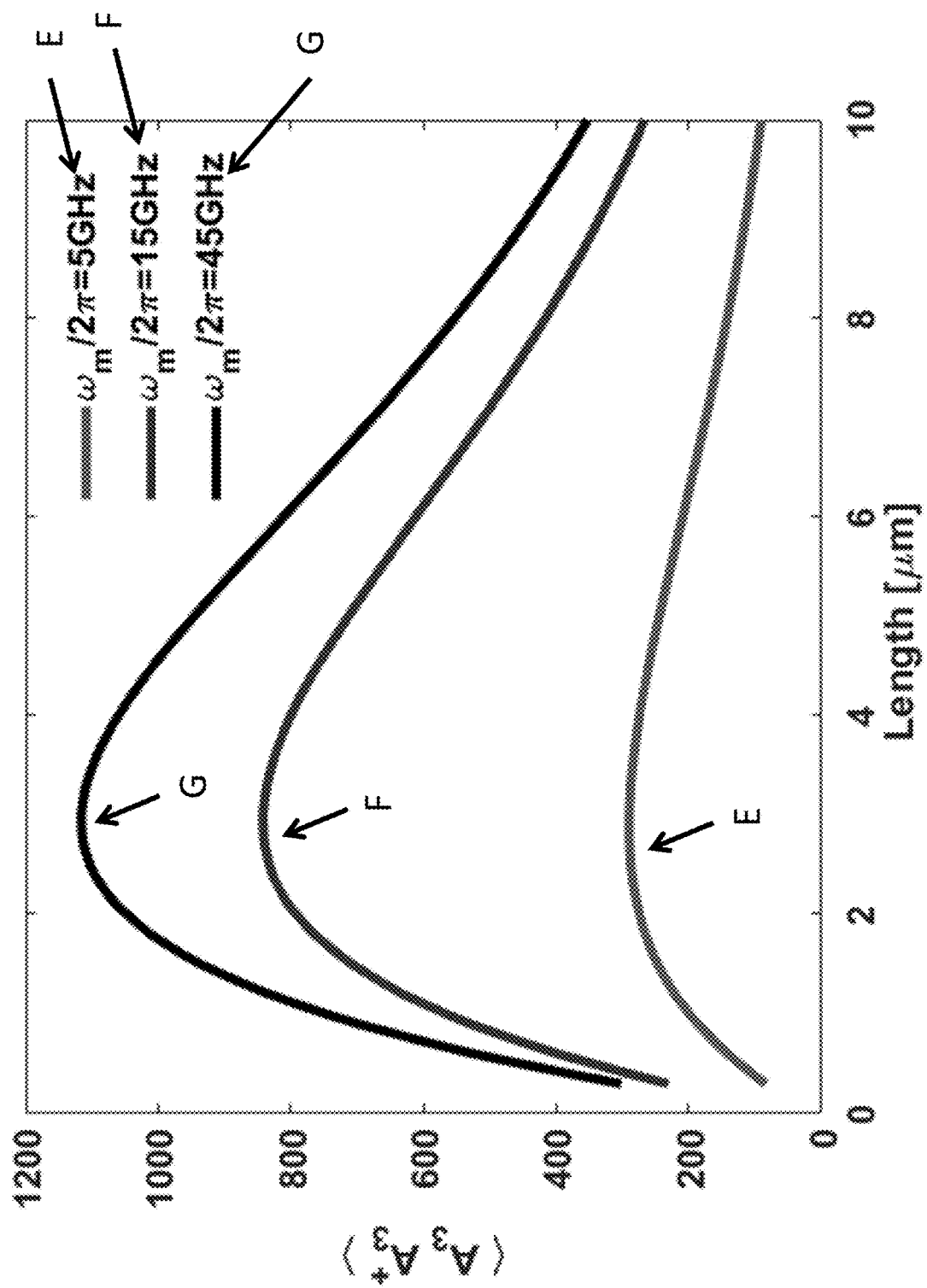

In embodiments, width W=1 μm and the length L is considered with different values. As shown in FIG. 3, the entanglement condition $\Lambda$ is evaluated versus the waveguide length. In embodiments, the optical pump intensity is $|A_1|^2 = 10^6$, the microwave number of photons is $\hat{B}^\dagger \hat{B}|_{t=0} = 10^4$ And, the three different microwave frequencies ($\omega_m/2\Pi$) are considered—5 GHz, 15 GHz, and 45 GHz. Thus, the fields are entangled for different waveguide lengths. In embodiments, the entanglement is stronger for a larger microwave frequency. In embodiments, the entanglement strength increases against the waveguide length until losses begin to take over. In FIG. 4, a number of generated photons at the lower sideband is calculated. In embodiments, as shown in FIG. 4, a greater number of photons are generated for an optimum waveguide length. In embodiments, with limited losses, both the entanglement and the number of photos at the lower sideband have the same optimum waveguide length (L=2.7 μm).

Figure 5:
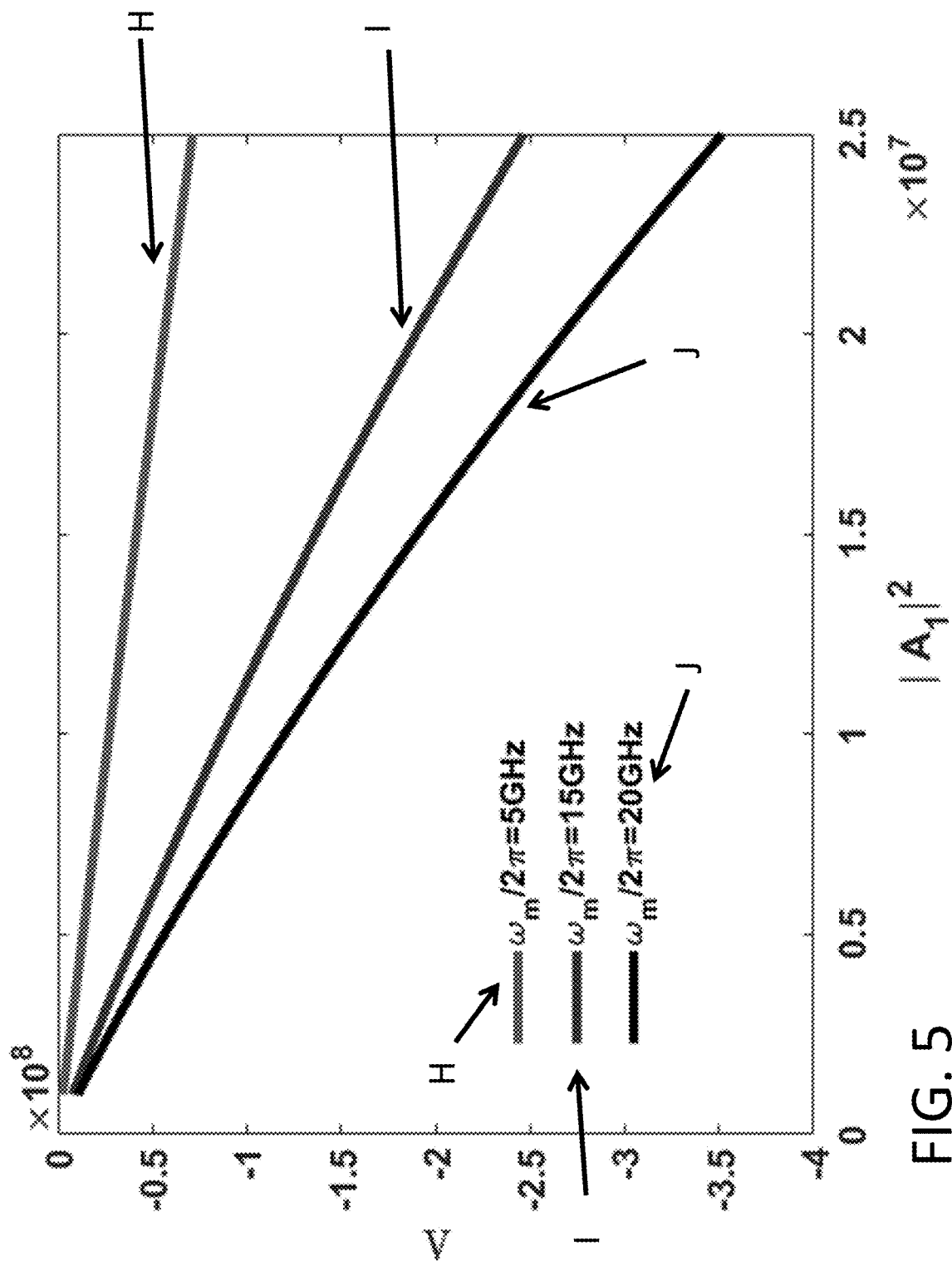
FIGS. 5 and 6 are example electronically generated graphs.
Figure 6:
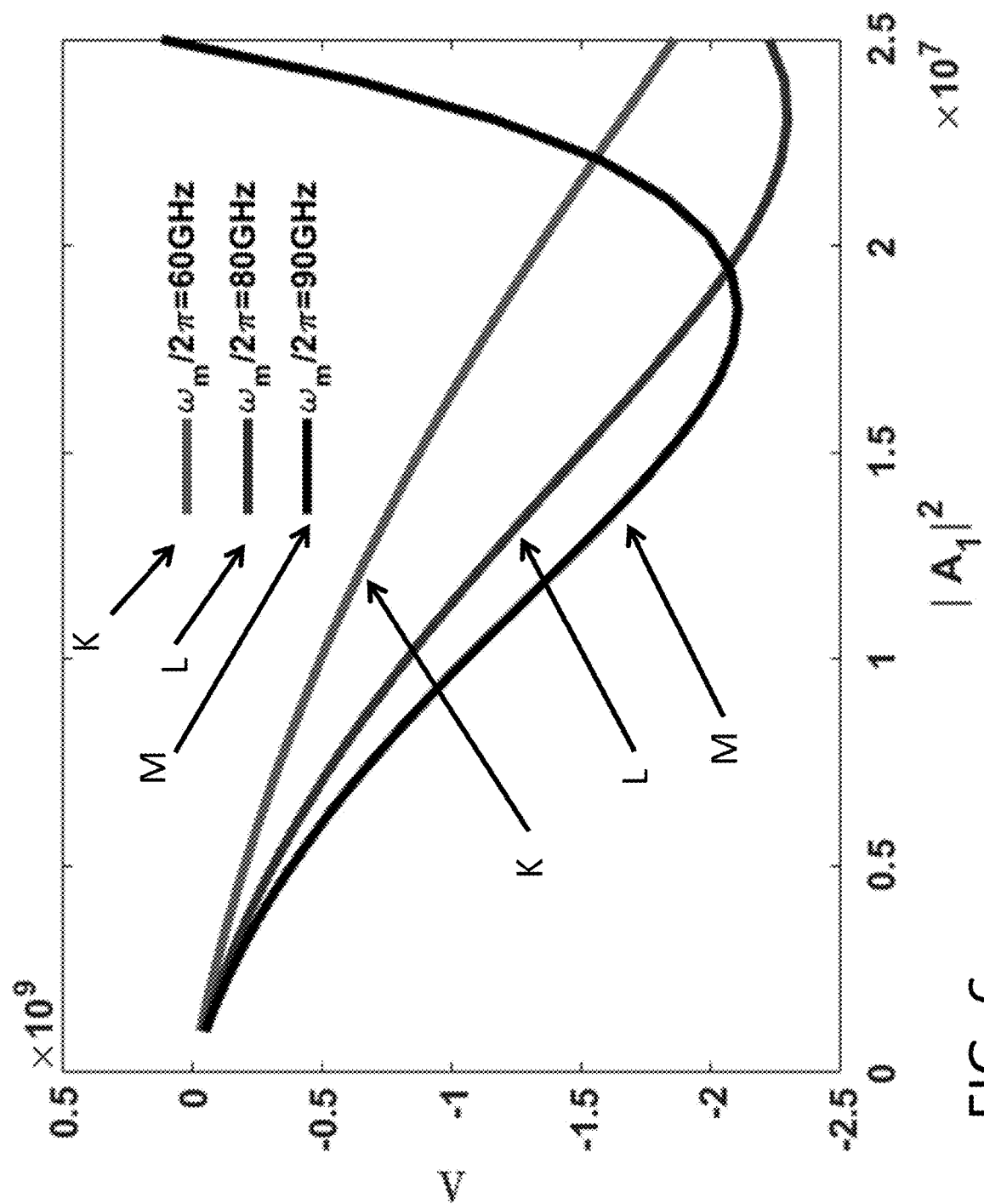

FIGS. 5 and 6 shows a relationship between an entanglement condition versus an optimum waveguide length (L=2.7 μm). In embodiments, different microwave frequencies are analyzed. In FIG. 5, $\omega_m/2\Pi$ with values at 5 GHz, 15 GHz, and 20 GHz are considered. In FIG. 6, $\omega_m/2\Pi$ with values at 60 GHz, 80 GHz, and 90 GHz. In both FIGS. 5 and 6, the entanglement depends on pump intensity. In FIG. 5, the entanglement is stronger for larger pump intensities. In FIG. 6, the entanglement is maximized over pump intensities and gets weaker for larger pump intensities. For example at $\omega_m/2\Pi = 5$ GHz, the entanglement is stronger for larger pump intensities. For $\omega_m/2\Pi = 90$ GHz, reaches it maximum at $|A_1|^2 = 1.8 \times 10^7$. In embodiments, the entanglement gets weaker for larger intensities and disappears for intensities greater than $|A_1|^2 = 2.5 \times 10^7$.

Figure 7:
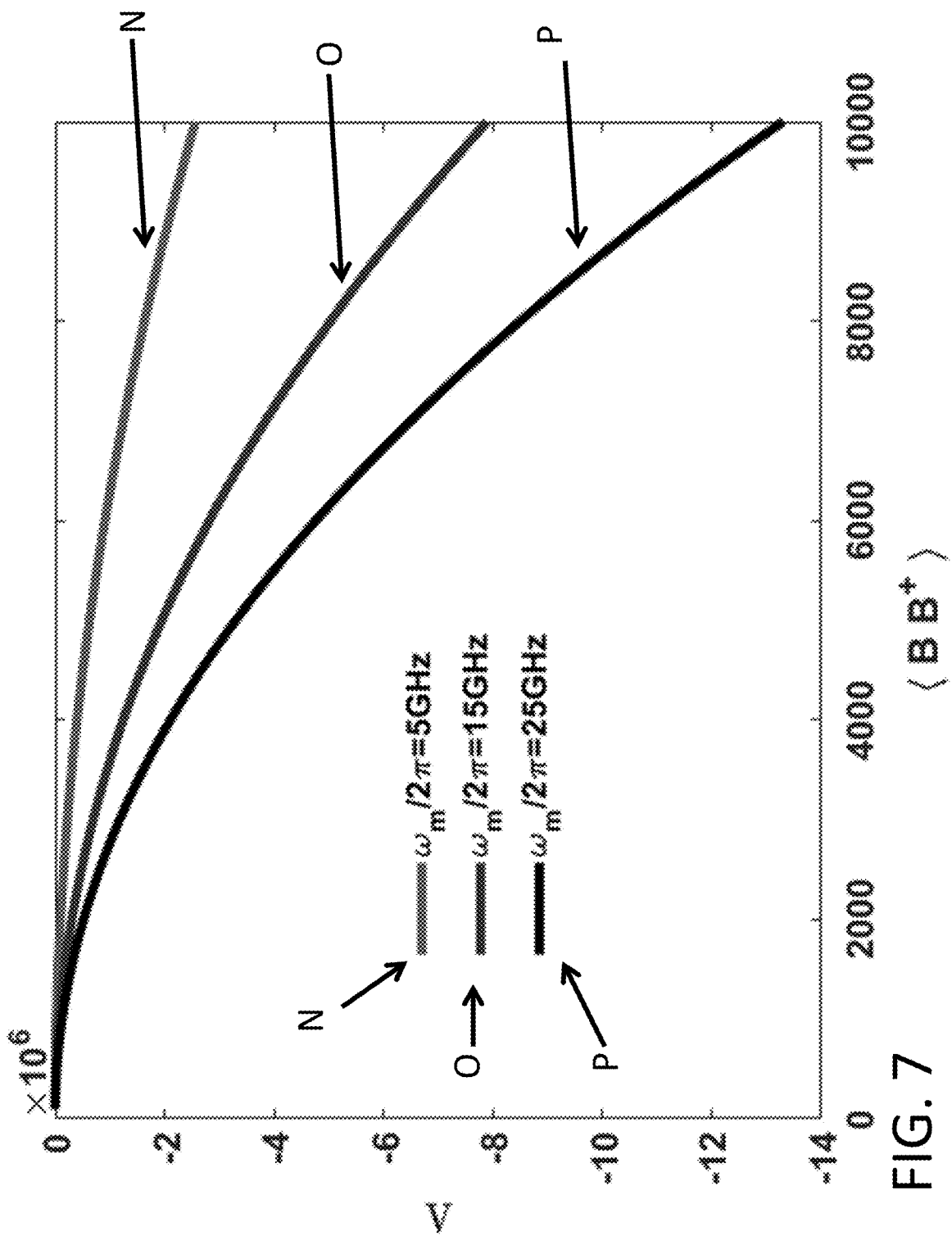
FIG. 7 is an example electronically generated graph.
Figure 8:
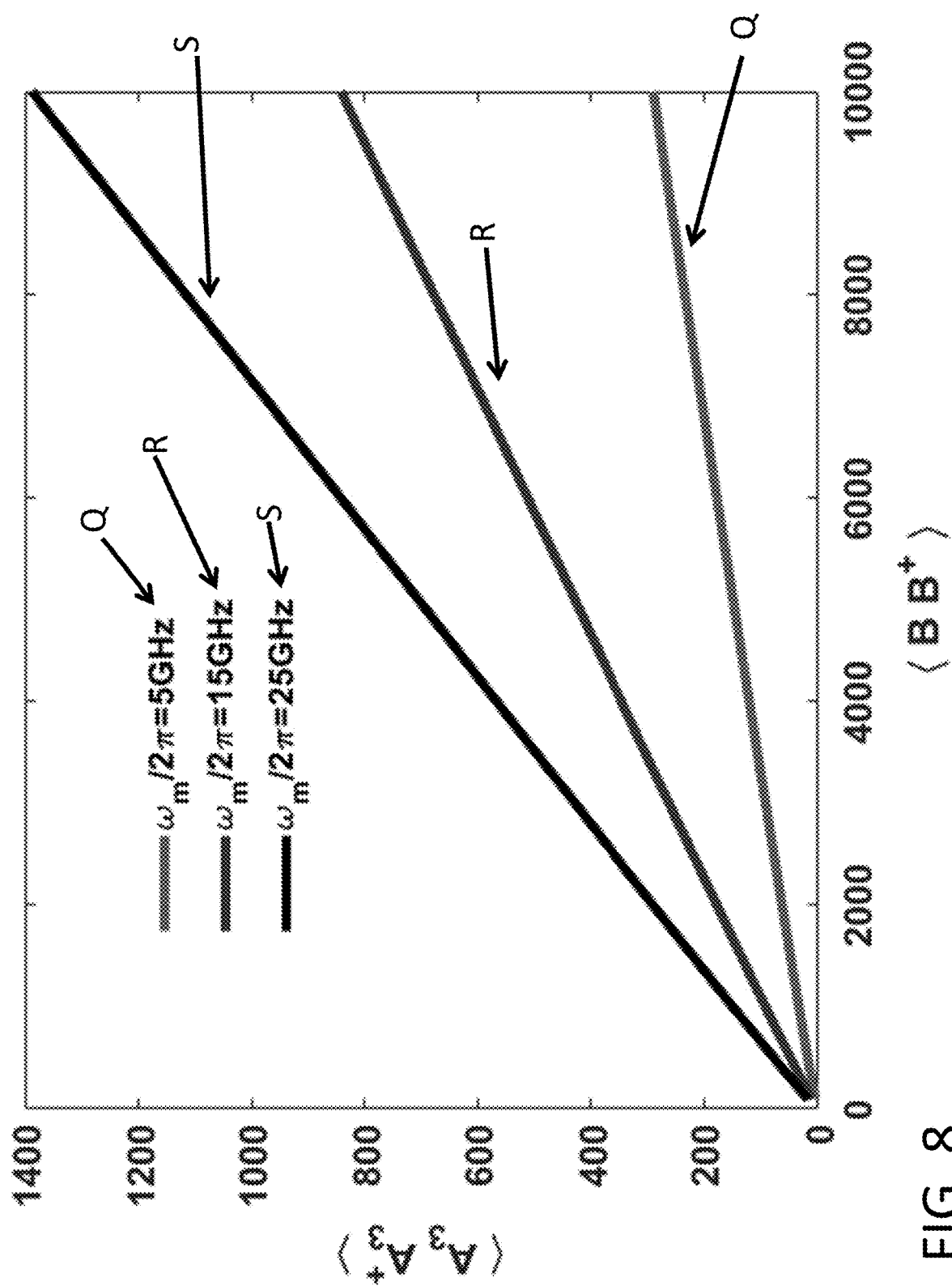
FIG. 8 is an example electronically generated graph.

In FIG. 7, the example entanglement condition $\Lambda$ and the number of generated photons at the lower sideband are evaluated versus the microwave number of photons. In embodiments, the entanglement is stronger for larger number of microwave photons. In embodiments, the entanglement is also stronger for the number of photons generated at the lower sideband. In embodiments, different microwave frequencies are considered. Thus, the entanglement strength and the number of generated photons become intensified for higher microwave frequencies. In FIG. 8, the number of optical photons at $\omega_3$ versus the microwave number of photons is determined with $|A_1|^2 = 10^6$ and L=2.7 μm.

Figure 9:
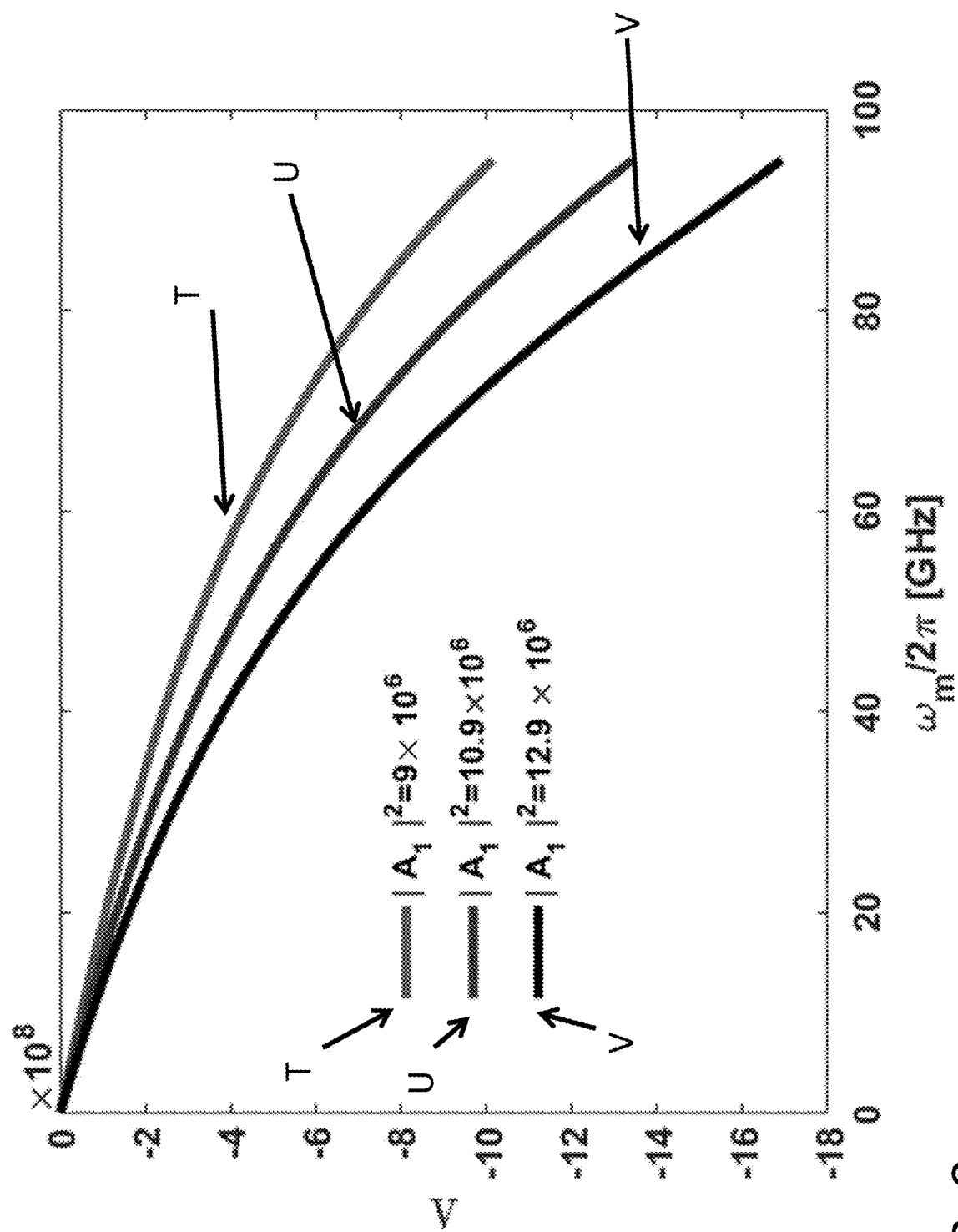
FIGS. 9 and 10 are example electronically generated graphs.
Figure 10:
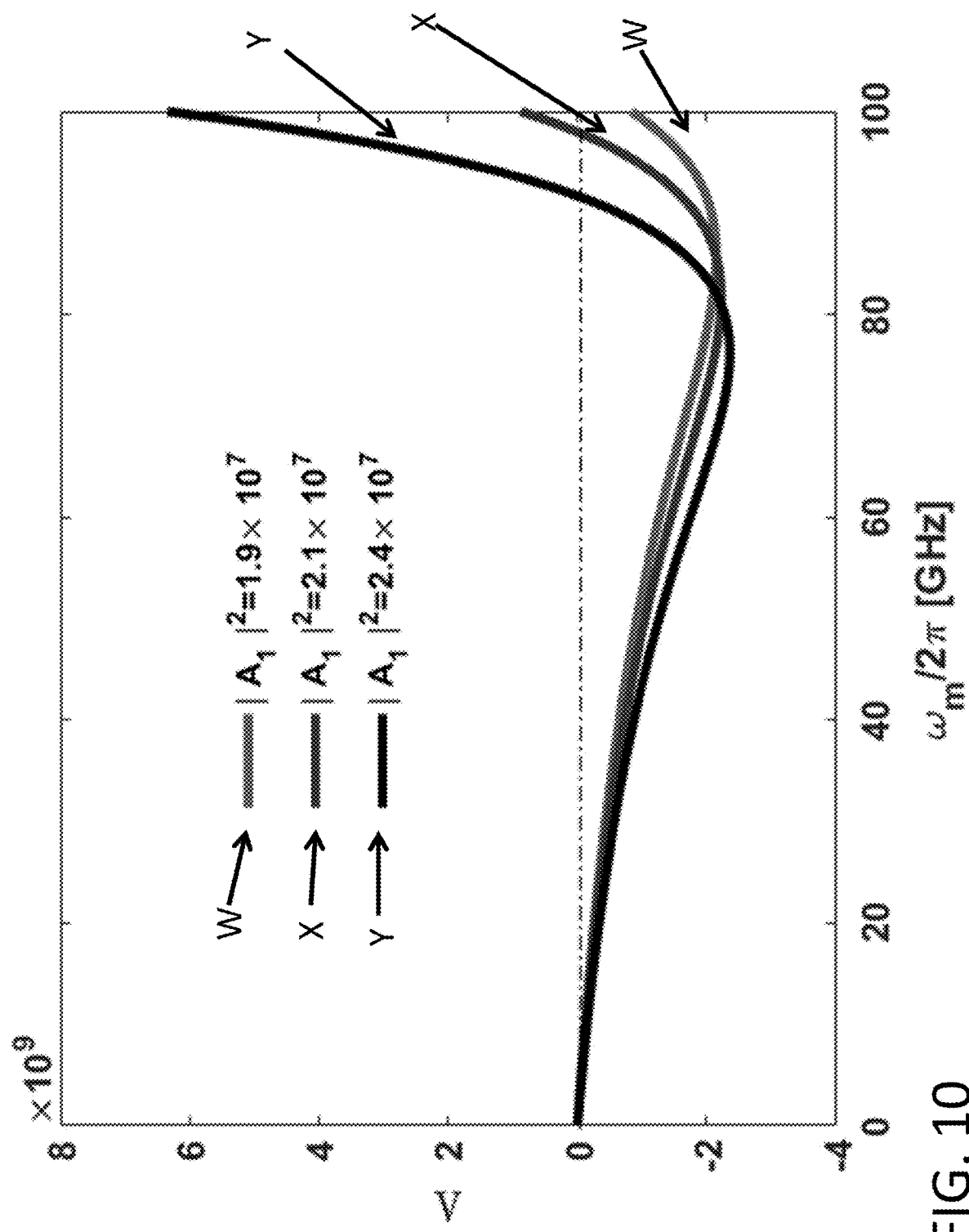

In FIGS. 9 and 10, the entanglement condition $\Lambda$ is analyzed against microwave frequency. In embodiments, different pump intensities are considered. In FIG. 9, the entanglement is considered for values of $|A_1|^2$ at $9 \times 10^6$, $10.9 \times 10^6$, and $12.9 \times 10^6$. In FIG. 10, the pump intensities are considered for values of $|A_1|^2$ at $1.9 \times 10^7$, $2.1 \times 10^7$, and $2.4 \times 10^7$. In embodiments, as shown in FIG. 9, the entanglement is stronger for higher microwave frequency and larger pump intensity. In embodiments, as shown in FIG. 10, the entanglement strength increases against microwave frequency until reaching an optimal value and then starts to decrease until there is no entanglement. In embodiments, both the optimum frequency and the frequency at which disentanglement is reached are for smaller for a larger pump intensity. However, a large pump intensity may result in stronger entanglement.

For example, for $|A_1|^2 = 1.9 \times 10^7$, the entanglement strength is maximal at the optimum microwave frequency $\omega_m/2\Pi = 86$ GHz and disentanglement is reached at $\omega_m/2\Pi = 100$ GHz. However, for $|A_1|^2 = 2.4 \times 10^7$, the entanglement optimum frequency is $\omega_m/2\Pi=76$ GHz and disentanglement is reached at $\omega_m/2\Pi=96$ GHz. In these non-limiting examples, the entanglement at $\omega_m/2\Pi=76$ for $|A_1|^2=2.4\times10^7$ is stronger than that at $\omega_m/2\Pi=86$ for $|A_1|^2=1.9\times10^7$.

Based on the above example formulas and charts, microwave and optical fields entanglement based on electrical capacitor loaded with graphene plasmonic waveguide are analyzed for optimal values. In embodiments, a microwave voltage is applied to the capacitor while a graphene waveguide is subjected to an optical surface plasmon polariton (i.e., SPP) input. Accordingly, SPP sidebands are generated at the expense of the input SPP pump and the driving microwave signal. In embodiments, a quantum mechanics model is generated to describe the fields interactions and derived motion equations indicates entanglement between the microwave and the lower SPP sideband.

In embodiments, Duan's criterion is used to investigate the entanglement. In embodiments, the equations needed to evaluate the Duan's determinant are derived from the motion equation using the quantum regression theorem. Thus, the microwave signal and the lower SPP sideband are entangled over a vast microwave frequency. In embodiments, the entanglement is evaluated against the waveguide length. Limited by losses, it is observed that an optimum waveguide length at which the entanglement strength (and number of photons at the lower side band) is maximized. Additionally, the entanglement versus the SPP pump intensity takes into account an optimum length. In embodiments, the entanglement is stronger for larger pump intensity. However, for intensive pump inputs and microwave frequencies greater than 50 GHz, there is an optimum pump intensity at which the entanglement is maximized and then decreases for larger intensity values until disentanglement is observed. In embodiments, the entanglement is evaluated versus the microwave number of photons. The larger the number of microwave photons, the stronger the entanglement. In addition, the entanglement is evaluated versus the microwave frequency. It is found that the entanglement is attained over a particular range with a particular pump intensity. Thus, a frequency tunable process is provided for effective microwave-optimal entanglement.

Figure 11:
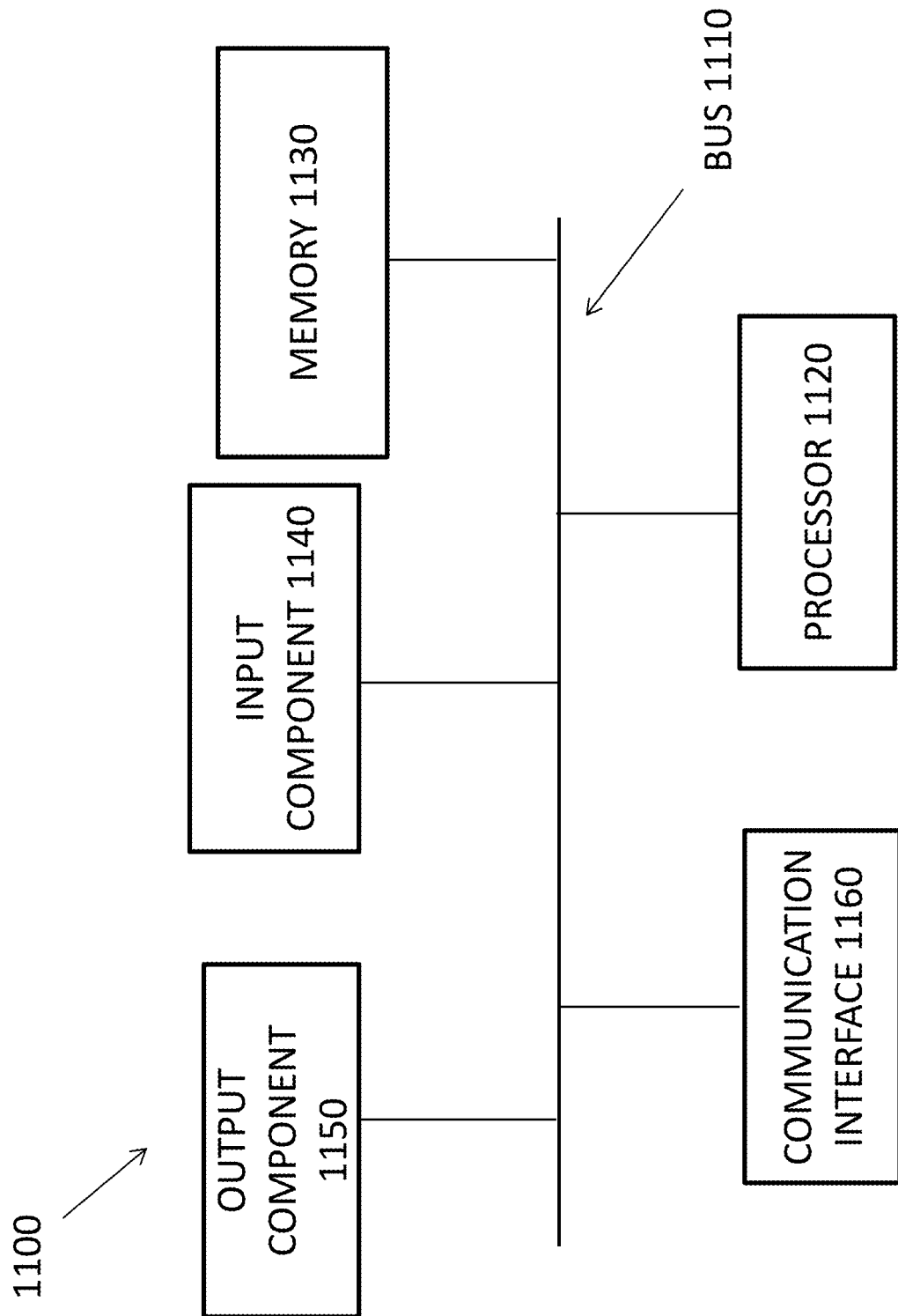
FIG. 11 is an example computer device.

FIG. 11 is a diagram of example components of a device 1100. Device 1100 may correspond to a computing device, such as devices 1100, 1200, 1300 and/or 1302. Alternatively, or additionally, devices 1100, 1200, 1300, and/or 1202 may include one or more devices 1100 and/or one or more components of device 1100.

As shown in FIG. 11, device 1100 may include a bus 1110, a processor 1120, a memory 1130, an input component 1140, an output component 1150, and a communications interface 1160. In other implementations, device 1100 may contain fewer components, additional components, different components, or differently arranged components than depicted in FIG. 11. Additionally, or alternatively, one or more components of device 1100 may perform one or more tasks described as being performed by one or more other components of device 1100.

Bus 1110 may include a path that permits communications among the components of device 1100. Processor 1120 may include one or more processors, microprocessors, or processing logic (e.g., a field programmable gate array (FPGA) or an application specific integrated circuit (ASIC)) that interprets and executes instructions. Memory 1130 may include any type of dynamic storage device that stores information and instructions, for execution by processor 1120, and/or any type of non-volatile storage device that stores information for use by processor 1120. Input component 1140 may include a mechanism that permits a user to input information to device 1100, such as a keyboard, a keypad, a button, a switch, voice command, etc. Output component 1150 may include a mechanism that outputs information to the user, such as a display, a speaker, one or more light emitting diodes (LEDs), etc.

Communications interface 1160 may include any transceiver-like mechanism that enables device 1100 to communicate with other devices and/or systems. For example, communications interface 1160 may include an Ethernet interface, an optical interface, a coaxial interface, a wireless interface, or the like.

In another implementation, communications interface 1160 may include, for example, a transmitter that may convert baseband signals from processor 1120 to radio frequency (RF) signals and/or a receiver that may convert RF signals to baseband signals. Alternatively, communications interface 1160 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 1160 may connect to an antenna assembly (not shown in FIG. 11) for transmission and/or reception of the RF signals. The antenna assembly may include one or more antennas to transmit and/or receive RF signals over the air. The antenna assembly may, for example, receive RF signals from communications interface 1160 and transmit the RF signals over the air, and receive RF signals over the air and provide the RF signals to communications interface 1160. In one implementation, for example, communications interface 1160 may communicate with a network (e.g., a wireless network, wired network, Internet, etc.).

As will be described in detail below, device 1100 may perform certain operations. Device 1000 may perform these operations in response to processor 1120 executing software instructions (e.g., computer program(s)) contained in a computer-readable medium, such as memory 1130, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 1030 from another computer-readable medium or from another device. The software instructions contained in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

Figure 12:
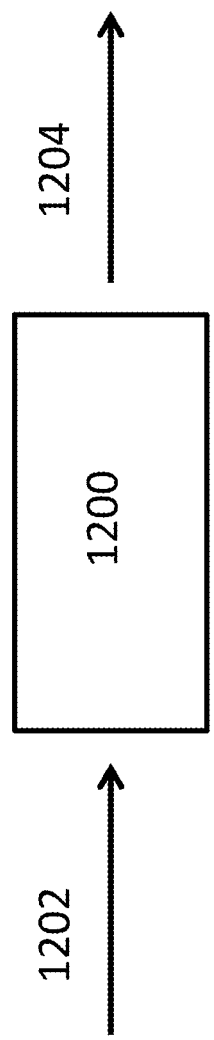
FIG. 12 is an example system.

FIG. 12 is an example diagram. FIG. 12 describes device 1200, communication 1202, and communication 1204. In embodiments, device 1200 may a computing device with features/structures similar to that described in FIG. 12. In embodiments, device 1200 may be a computing device that is part of a laptop, desktop, tablet, smartphone, and/or any other device that may receive communication 1202, analyze communication 1202, and generate output 1204 based on communication 1202. As shown in FIG. 12, communication 1202 may be received by device 1200 (e.g., via keyboard inputs, touchscreen inputs, voice inputs, etc.). In embodiments, communication 1202 may include information about a graphene structure, such as number of layers, thickness, distance between layers, electric features, dielectric features, etc. In embodiments, device 1200 may receive communication 1202 and, based on one or more of equations (1) to (17), as described above, that generate output 1204 that includes information about entanglement of microwave and optical fields with a particular waveguide length, frequency, and/or other information associated with equations (1) to (17).

Figure 13:
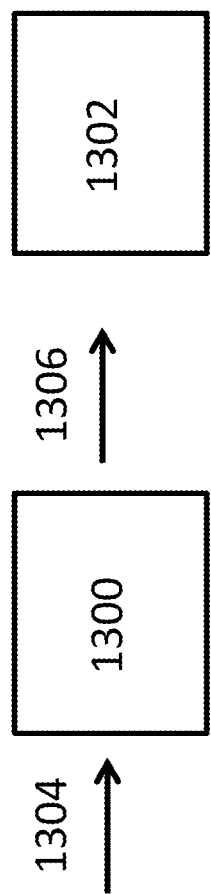
FIG. 13 is an example system

FIG. 13 is an example diagram. FIG. 13 describes device 1300, device 1302, input 1304, and output 1206. In embodiments, device 1200 may a computing device with features/structures similar to that described in FIG. 13. In embodiments, device 1300 may be a computing device that is part of a laptop, desktop, tablet, smartphone, and/or any other device that may receive communication 1302, analyze communication 1304, and generate output 1306 based on communication 1304. In embodiments, device 1300 may be a computing device that is part of a laptop, desktop, tablet, smartphone, and/or any other device that may receive communication 1204, analyze communication 1304, and generate output 1306 based on communication 1304. In embodiments, device 1302 may be a computing device that is part of a laptop, desktop, tablet, smartphone, and/or any other device that may receive output 1306, analyze output 1306, and generate output 1308 based on output 1306.

In embodiments, communication 1304 may include microwave field information based on one or more of equations (1) to (17) as described above. In embodiments, device 1300 may receive communication 1304 and analyze communication 1304 based on one or more equations (1) to (17). In embodiments, device 1200 may generate output 1306. In embodiments, output 1306 may include electronic design information for a graphene structure. In embodiments, output 1206 may be received by device 1302. In embodiments, device 1302 may generate a physical graphene structure (e.g., graphene structure 100). In embodiments, device 1302 may include wafer fabrication systems. In embodiments, device 1302 may generate a graphene structure or a composite structure that includes a graphene structure.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 11, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices. Also it will be understood that any of the various actions can result in any type of electronic information to be displayed in real-time and/or simultaneously on multiple user devices. For FIGS. 2 to 9, the electronic graphs may be generated by a computing device, such as device 1000, and displayed via a graphical user device (GUI).

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, the phrase "converted text," or "converted information" may indicate information that has been converted from handwritten or non-handwritten information to printed information. The phrase "information" may indicate letters, words, numbers, and/or symbols. The phrase "text" may indicate letters, numbers, and/or symbols. The phrases "information" and "text" may indicate the same thing, i.e., letters, numbers, and/or symbols. Also, while the above examples are associated with prescriptions, pharmacists, and doctors, the above example actions may also be used for other scenarios and analysis of other types of handwritten text, such as with purchase orders, shipping orders, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device comprising:
   memory; and
   a processor to:
   receive electronic information about a graphene structure; and
   determine, based on the electronic information, an entanglement of optical and microwave fields for a particular waveguide length;
   determine a distance between different parts of the graphene structure; and
   determine a particular length for the graphene structure.

2. The device of claim 1, where the processor is further to:
   determine a pump intensity value associated with the amount of voltage.

3. The device of claim 1, where the processor is further to:
   determine an entanglement of optical and voltage fields for the graphene structure.

4. The device of claim 1, wherein the processor is further to:
   determine that the graphene structure requires a driving microwave voltage that is less than 10 microvolts.

5. The device of claim 1, wherein the processor is further to:
   determine a particular frequency for the SPP mode received by the graphene structure and wherein 99.9% of the SPP mode is contained between two plates associated with the graphene structure.

6. The device of claim 1, wherein the graphene structure is pumped by an optical pump.

7. The device of claim 5, wherein, based on the SPP mode, the processor further determines that an upper and lower SPP sideband are each generated at particular frequencies.

8. The device of claim 7, wherein the processor is further to:

determine a particular pump intensity at which a microwave signal and the lower SPP sideband are entangled.

9. The device of claim 8, wherein the graphene structure provides a tunable mechanism for microwave-optical entanglement.

10. The device of claim 1, wherein the processor is further to:
determine that the entanglement is changed based on at least one of:
graphene waveguide length,
microwave frequency,
microwave number of photons,
and pump intensity.

11. The device of claim 7, wherein a microwave signal and the lower SPP sideband associated with the graphene structure, are entangled over a microwave frequency.

12. The device of claim 1, wherein the entanglement versus a SPP pump intensity is based on optimum length, wherein the entanglement is stronger for larger pump intensity.

13. The device of claim 1, wherein the processor is further to:
evaluate the entanglement is evaluated versus microwave number of photons; and
determine that a larger number of microwave photons, the stronger the entanglement.

* * * * *